Figure 1:
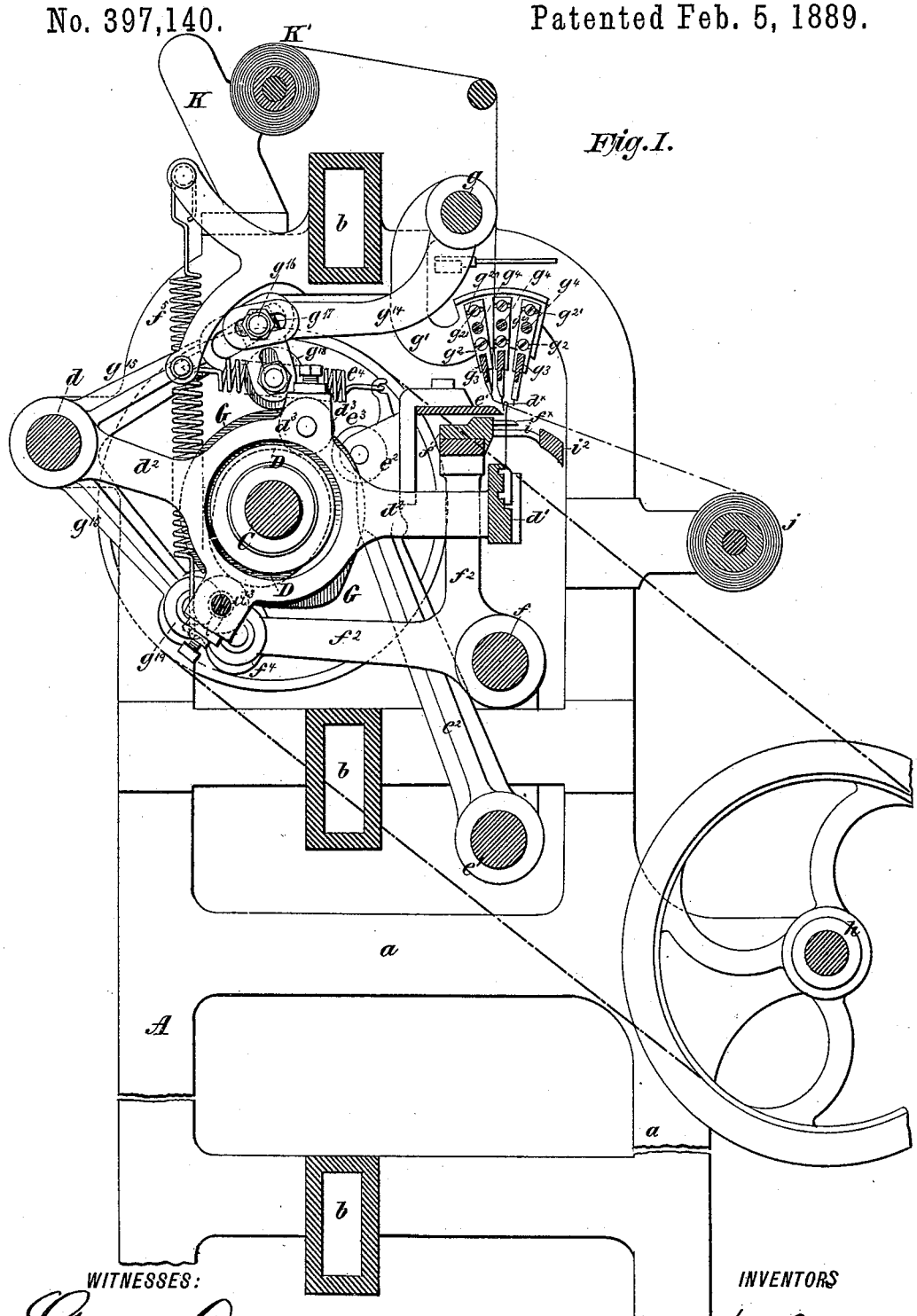

(No Model.) 6 Sheets—Sheet 1.

H. B. PAYNE & W. CAMPION.
WARP KNITTING MACHINE.

No. 397,140. Patented Feb. 5, 1889.

WITNESSES:
Gustave Dieterich
T. F. Bourne.

INVENTORS
Henry Blackford Payne,
William Campion,
BY Briesen & Steele
ATTORNEYS (No Model.) 6 Sheets—Sheet 2.

H. B. PAYNE & W. CAMPION.
WARP KNITTING MACHINE.

No. 397,140. Patented Feb. 5, 1889.

Fig. 2.

WITNESSES:
A. Schehl.
Ch. Weed.

INVENTORS,
Henry B. Payne
and Wm Campion
BY
Goepel & Raegener
ATTORNEYS.

(No Model.) 6 Sheets—Sheet 3.
H. B. PAYNE & W. CAMPION.
WARP KNITTING MACHINE.
No. 397,140. Patented Feb. 5, 1889.
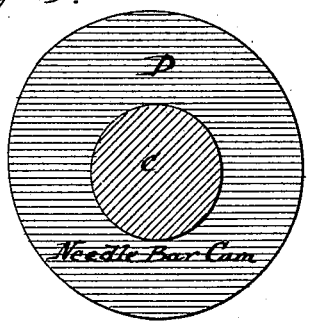
Fig. 3. — Needle Bar Cam
Fig. 4. — Needle Bar Counter Cam
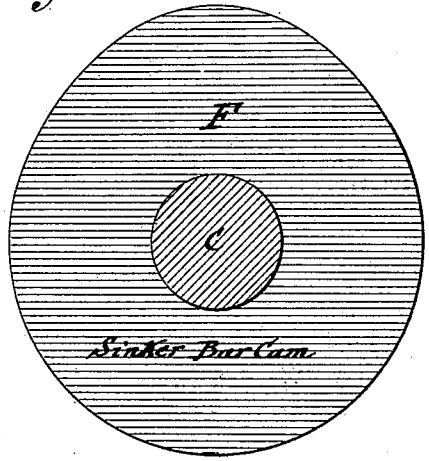
Fig. 6. — Sinker Bar Cam
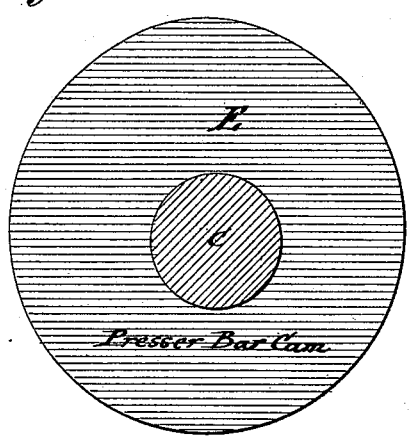
Fig. 5. — Presser Bar Cam
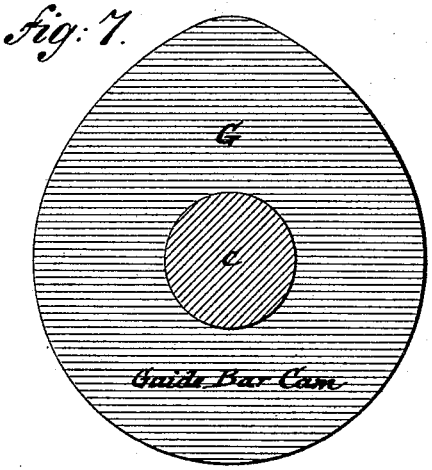
Fig. 7. — Guide Bar Cam
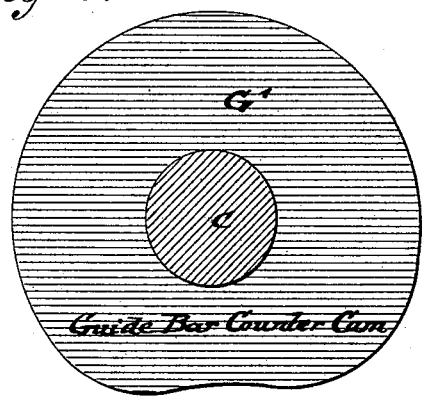
Fig. 8. — Guide Bar Counter Cam
WITNESSES
A. Schehl,
Carl Kern
INVENTORS,
Henry B. Payne
William Campion
By their Attorneys
Goepel & Raegener (No Model.) 6 Sheets—Sheet 4.
H. B. PAYNE & W. CAMPION.
WARP KNITTING MACHINE.
No. 397,140. Patented Feb. 5, 1889.
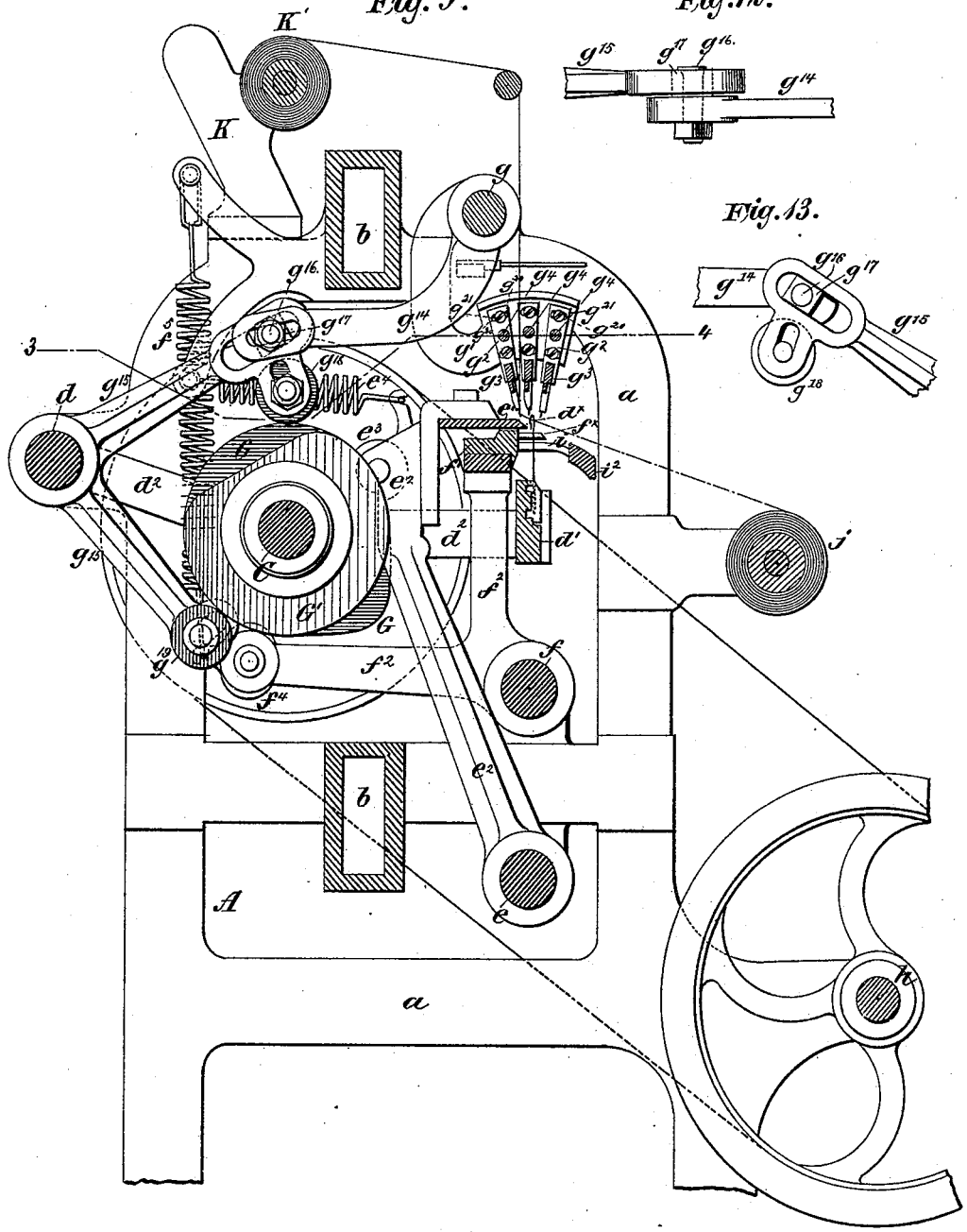
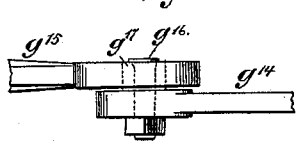
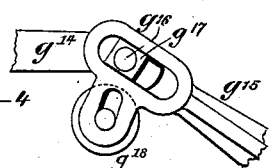
WITNESSES:
Gustave Dieterich
T. F. Bourne.
INVENTORS:
Henry B. Payne
W. Campion
BY Briesen & Steele
ATTORNEYS.

(No Model.) 6 Sheets—Sheet 5.

H. B. PAYNE & W. CAMPION.
WARP KNITTING MACHINE.

No. 397,140. Patented Feb. 5, 1889.

WITNESSES:
Gustave Dieterich
T. F. Bourne

INVENTORS:
Henry B. Payne
W. Campion
BY Briesen & Steele
ATTORNEYS.

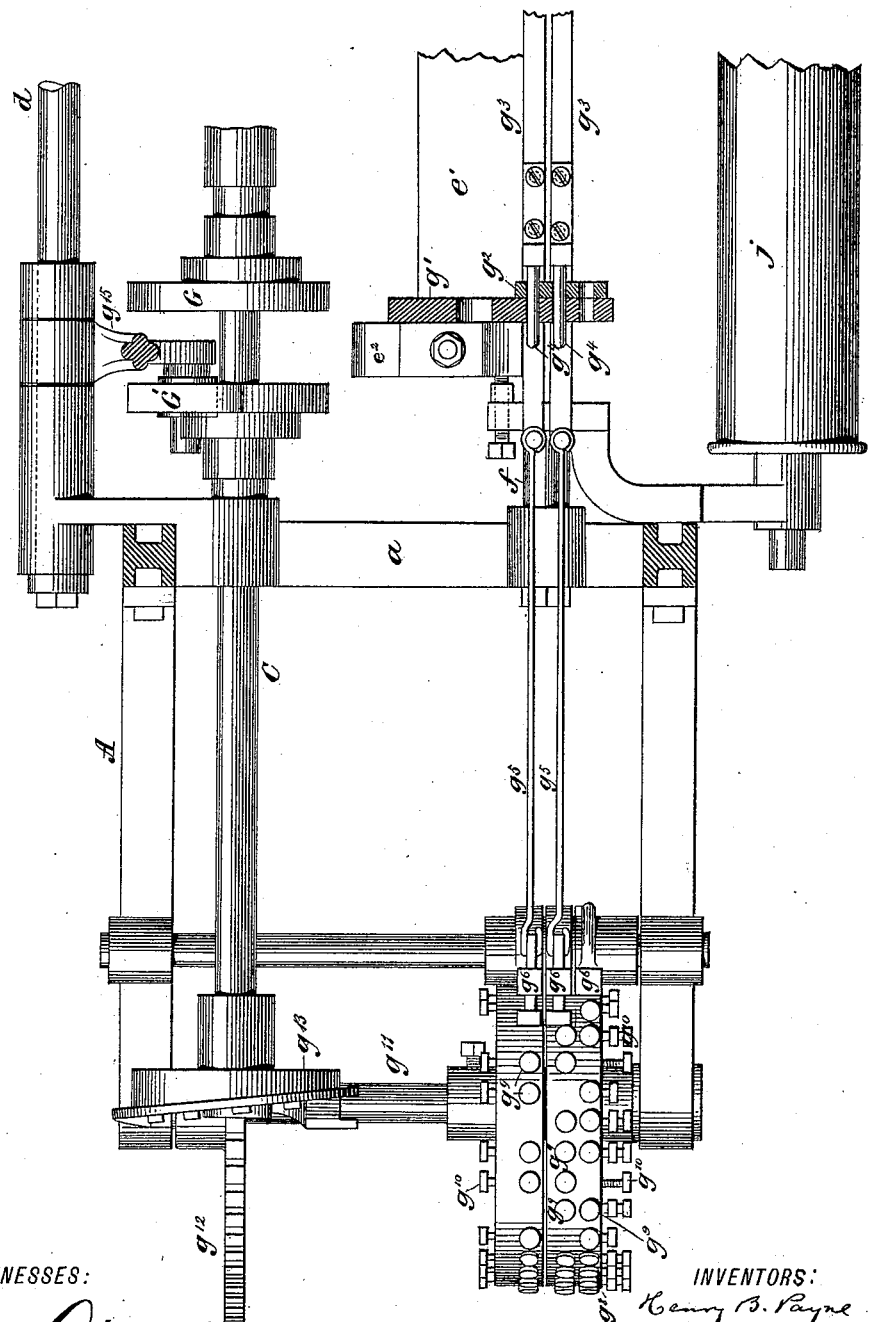

United States Patent Office.

HENRY BLACKFORD PAYNE AND WILLIAM CAMPION, OF RADFORD, COUNTY OF NOTTINGHAM, ENGLAND; SAID CAMPION ASSIGNOR, BY MESNE ASSIGNMENTS, TO A. G. JENNINGS & SONS, OF BROOKLYN, NEW YORK.

WARP-KNITTING MACHINE.

SPECIFICATION forming part of Letters Patent No. 397,140, dated February 5, 1889.

Application filed January 21, 1886. Serial No. 189,256. (No model.) Patented in England June 4, 1885, No. 6,828.

*To all whom it may concern:*

Be it known that we, HENRY BLACKFORD PAYNE and WILLIAM CAMPION, of Radford, in the county of Nottingham, Kingdom of England, have invented certain new and useful Improvements in Warp-Knitting Machines, (for which Letters Patent have been granted to us in England under date of June 4, 1885, numbered 6,828,) of which the following is a specification.

This invention relates to machines for making knitted warp fabrics, which machines are more commonly known as "warp-machines," and more especially to improvements on the warp-machine invented by Henry Blackford Payne, for which an application for Letters Patent was filed January 21, 1886, Serial No. 189,238, the improvements being designed with a view to simplify the construction of said machine by securing the sley to the bar that carries the sinkers and making the oscillating motions of the guide-bars adjustable, whereby the motions of parts can be shortened and the machine can be worked at greater speed.

The invention consists of a warp-machine which combines a needle-bar having bearded needles, a presser-bar, a sinker-bar to which is secured the sley, said sley being placed below the sinkers on the sinker-bar, guide-bars, and mechanism by which motion is imparted to said bars from cams of a longitudinal cam-shaft, the laterally-reciprocating motion of the guide-bars being extended or shortened by suitable adjusting mechanism, and endwise motion being imparted simultaneously thereto by a rotary stud-wheel and lever-connection, as will appear more fully hereinafter, and finally be pointed out in the claims.

Figure 10:
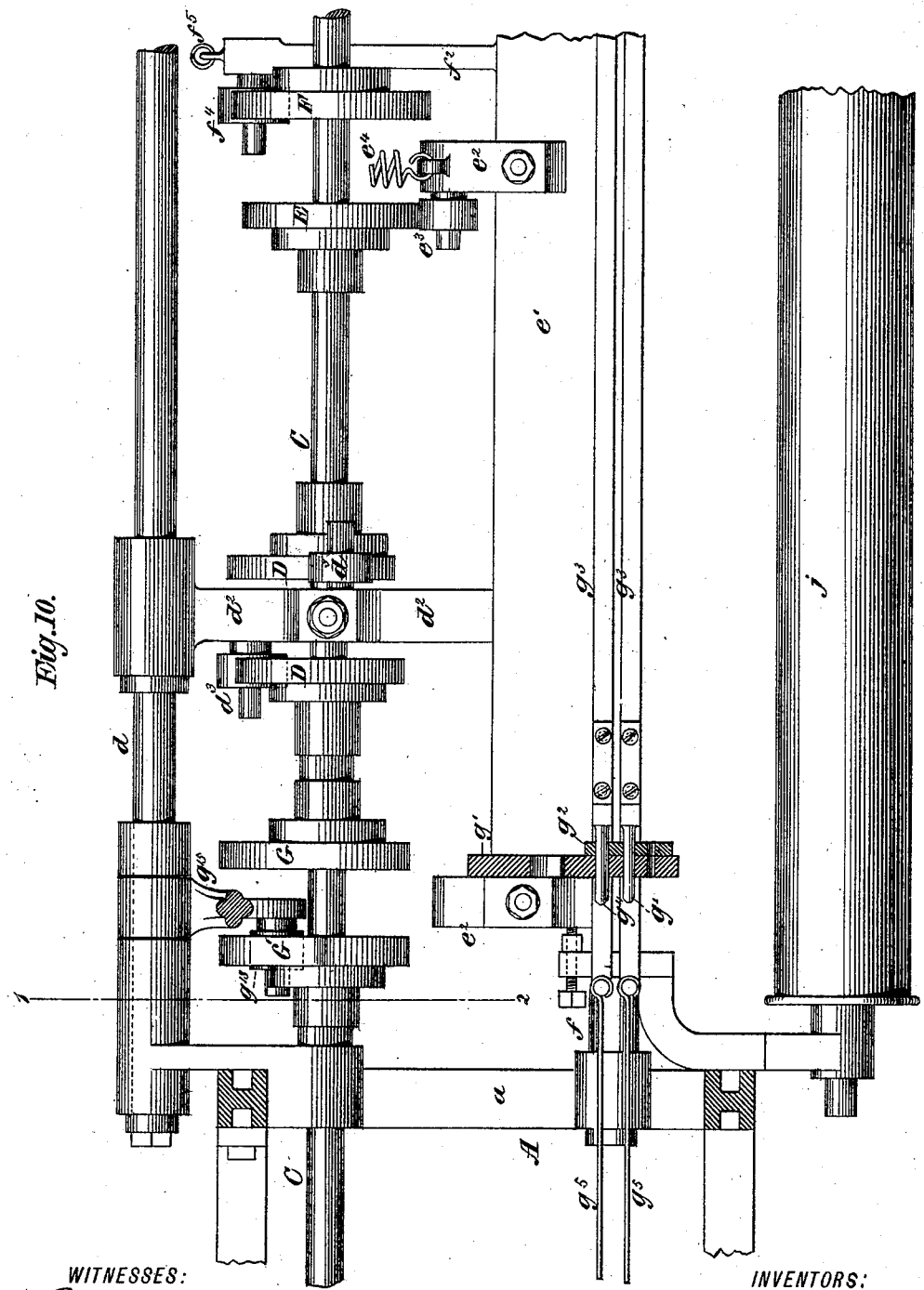

In the accompanying drawings, Figure 1 represents a vertical transverse section of our improved warp-machine. Fig. 2 is a front elevation of the machine, partly broken away, the bar $i^2$ being removed. Figs. 3, 4, 5, 6, 7, and 8 are detail side views of the different cams by which motion is imparted to the different working parts of the machine. Fig. 9 is a vertical cross-section on the plane of the line 1 2 of Fig. 10. Fig. 10 is a horizontal section on the line 3 4 of Fig. 9. Fig. 11 is a plan view, partly in section, showing, mainly, the mechanism for actuating the guide-bars; and Figs. 12 and 13 are detail plan and side views, respectively, of part of the guide-bar-actuating levers.

Similar letters of reference indicate corresponding parts.

In the drawings, the letter A represents the supporting-frame of our improved warp-machine, which frame consists of end standards, $a$ $a$, and one or more intermediate supports, and of one or more longitudinal tie-bars, $b$ $b$, which connect the standards and intermediate supports.

The different parts of the machine receive motion from a longitudinal cam-shaft, C, that turns in suitable bearings in the supporting-frame A. Besides the said cam-shaft, the frame A supports the needle-bar rock-shaft $d$, presser-bar rock-shaft $e$, point or sinker bar rock-shaft $f$, guide-bar rock-shaft $g$, and the hand-wheel shaft $h$. The working parts of the machine consist of a needle-bar, $d'$, having bearded needles $d^x$, an independent presser-bar, $e'$, a sinker and sley bar, $f'$, and one or more guide-bars, $g^3$, all of which bars are connected by suitably-shaped levers to each of their respective rocking shafts $d, e, f,$ and $g$. The shaft $h$, by belt or otherwise, transmits motion to the shaft C for actuating the parts.

The needle-bar $d'$ is connected with its rock-shaft $d$ by means of levers $d^2$, that are preferably provided with circular openings, so as to allow the cam-shaft C to pass through them. Each of the levers $d^2$ is provided with rollers or contact-pieces $d^3$, that move upon the surface of suitably-shaped cams D, arranged in pairs for each lever $d^2$, both of which cams are keyed to the cam-shaft C. (See Fig. 10.) These cams, by acting on the levers $d^2$, impart a vertically-reciprocating motion to the needle-bar $d'$.

The presser-bar $e'$ is arranged to come in contact with and press the beards of the needles, and it is supported by levers $e^2$, which are fastened to the rock-shaft $e$. Said levers $e^2$ each carry a roller or contact-piece, $e^3$, that bears upon a properly-shaped cam, E, carried by the shaft C, there being one cam E for each lever $e^2$. The rollers $e^3$ are pressed against their respective cams E by means of springs $e^4$, that are secured at one end to the levers $e^2$ and at their opposite ends to the framing. As the cams E rotate, the presser-bar $e'$ will be alternately pressed against the beards of the needles $d^x$ by said cams, and then drawn away from said needles by the springs $e^4$.

The sinker-bar $f'$ is secured to the upwardly-extending arms of elbow-levers $f^2$, that are attached to the rock-shaft $f$. The ends of the lower arms of the elbow-levers $f^2$ carry rollers or contact-pieces $f^4$, that bear upon suitable cams, F, that are carried by the cam-shaft C, there being one cam F for each lever $f^2$. (See Fig. 10.) The rollers or contact-pieces $f^4$ are pressed against their respective cams F by means of springs $f^5$, that are secured at one end to the levers $f^2$ and at their opposite ends to the framing of the machine. The action of the springs $f^5$ and cams F serves to give the sinker-bar $f'$, through the medium of the levers $f^2$, a short reciprocating motion that is nearly horizontal.

The above construction of parts is substantially similar to that shown in the aforementioned application, No. 189,238. In that application, however, the sley is carried by a stationary bar secured to the framing.

In the accompanying drawings, the letter $i$ represents the sley. This sley is in the form of comb-teeth that project from a bar, $i^2$. The opposite ends of the teeth of the sley $i$ pass into and are secured to the sinker-bar $f'$. The needles $d^x$ pass through the sley $i$, between the comb-teeth thereof, and between the sinker-bar $f'$ and the comb-bar $i^2$, as clearly shown in Figs. 1 and 9. In Fig. 2 the bar $i^2$ is removed, showing the sley and sinker teeth between the needles. This sley $i$ preferably curves downward and forms a bed upon which the work rests. The sley $i$ is of such width that when it is moved inward by the sinker-bar it will still be beneath the work. Above the sley $i$ are sinkers $f^x$, for knocking over the loops formed on the needles. The sinkers $f^x$ are separate strips of metal that are passed into the sinker-bar $f'$ and suitably held therein. These sinkers $f^x$ project from the bar $f$ in the form of comb-teeth; but each sinker, being separate, can be readily removed and replaced in case of accident or for other cause. The needles $d^x$ pass between the sinkers $f^x$ and rise and fall in the sley $i$, said sinkers acting to secure the loops formed on the bearded needles.

As many longitudinal guide-bars $g^3$ as are required are guided in forked arms $g^2$, that are adjustably attached to the ends of forward-bent levers $g'$, which levers are secured to the guide-bar rock-shaft $g$. The guide-bars $g^3$ are supported on the levers $g'$ and arms $g^2$ by pins $g^4$, that are carried by the guide-bars, which pins pass through holes in the levers $g'$ and arms $g^2$, as shown in Figs. 1, 2, 10, and 11. The arms $g^2$, adjacent to the holes that receive the pins $g^4$, have slots $g^{20}$, as shown. Screws or bolts $g^{21}$ pass through the slots $g^{20}$ and into or through the levers $g'$, and serve to hold the arms $g^2$ in position on the levers $g'$. By means of these slots and screws the arms $g^2$ may be turned on their pins or pivots $g^4$, so as to tip the guide-bars $g^3$ with relation to the needles.

The guide-bars $g^3$ receive endwise motion by the following means: At one end each guide-bar $g^3$ is secured to a spring, $s$, (see Fig. 2,) the opposite ends of said springs being secured to the framing. The opposite end of each guide-bar is connected by a rod, $g^5$, to the upper end of a lever, $g^6$, as shown in Figs. 2, 10, and 11. The levers $g^6$ oscillate on the fulcrum $g^7$, while their lower pointed ends bear on stud-wheels $g^8$, carried by a shaft, $g^{11}$, that is journaled in the framing.

To the circumference of the wheels $g^8$ are secured as many rows of studs $g^9$ as there are levers $g^6$—one row for each lever. These studs $g^9$ pass into the wheels $g^8$, and are secured in place by means of set-screws $g^{10}$—one for each stud.

The studs $g^9$ may be of various sizes or placed at different distances apart, so as to form the different cam-surfaces required to give proper endwise motion to the guide-bars $g^3$. The studs of each row act to give motion to one of the levers $g^6$ and one of the guide-bars $g^3$.

To the shaft $g^{11}$ is also keyed a worm-wheel, $g^{12}$, that receives motion from a worm, $g^{13}$, that is keyed to the cam-shaft C. As the cam-shaft C rotates, the stud-wheel $g^8$, through the gearing $g^{12}$ and $g^{13}$, will be rotated. This imparts, by the studs on the circumference of the same, motion to the fulcrumed levers $g^6$ to move the guide-bars $g^3$ in one direction, the springs $s$ moving the guide-bars in the opposite direction. Said springs $s$, by their tension on the bars $g^3$, also act to keep the ends of the levers $g^6$ pressed against the stud-wheel $g^8$. By this means longitudinally-reciprocating motion is given to the guide-bars $g^3$.

Any desired number of guide-bars and their operating-levers and rows of studs may be used. The above parts, excepting the slotted arms $g^2$, are substantially similar to those in the before-mentioned application.

Besides the endwise motion imparted to the guide-bars $g^3$ by the stud-wheels $g^8$ and springs $s$, they receive a backward-and-forward or laterally-oscillating motion by means of levers $g^{14}$, that are each secured at one end to the rock-shaft $g$. The levers $g^{14}$ are slotted at their free ends and are connected to the upper arms of bell-crank levers $g^{15}$. These levers $g^{15}$ are mounted loosely on the needle-bar rock-shaft $d$, and are slotted at their upper ends or those ends that are connected to the levers $g^{14}$. The slots of both levers, $g^{14}$ and $g^{15}$, are placed side by side, and a spindle, $g^{16}$, is passed through both slots.

A square piece of metal, $g^{17}$, is screwed on one end of the spindle $g^{16}$ and nicely fitted in the slot of lever $g^{15}$, and the opposite end of the spindle $g^{16}$ is then secured to the slotted end of the lever $g^{14}$ by a lock-nut or other means.

$g^{18}$ is a roller or contact-piece placed on the spindle $g^{16}$ or carried by the upper arm of the lever $g^{15}$. This roller or contact-piece rides on the surface of the guide-bar cam G. The lower arm of the bell-crank lever $g^{15}$ also carries a roller or contact-piece, $g^{19}$, which rides upon the surface of the guide-bar counter-cam G'. By the described construction of the levers $g^{14}$ and $g^{15}$ and their connection at the slotted ends the laterally-oscillating motion of the guide-bars can be extended or reduced by moving the spindle $g^{16}$ and metal piece $g^{17}$ along in the slots of the levers $g^{14}$ $g^{15}$ and securing them by means of the lock-nut on the axle $g^{16}$.

Above the machine the necessary beam-tackle, K, is provided to receive the beams of yarn K' to supply the needles. Below the sinkers and sley a roller, j, is provided to receive the fabric.

The several movements of the parts are as follows: The needle-bar $d'$ rises vertically about half its motion. The lapping of its threads upon the needles is then made by the guide-bars $g^3$, which are moved to and fro by means of the levers $g'$, $g^{14}$, and $g^{15}$, actuated by the cams G G', and longitudinally by the springs s, rods $g^5$, levers $g^6$, and stud-wheels $g^8$. The needles then rise to their full extent to pass the laps under the beards of the needles. Then they descend, and just as the beards of the needles enter the sinkers $f^\times$ the presser-bar $e'$ presses the beards into the eyes of the needles and the work is then knocked over. The sinkers $f^\times$ then move back and forward, in order to secure the last loops made, at the same time moving the sley i, which always remains under the work.

The needles and other parts of the machine may be arranged to work either vertically, as shown, or horizontally, or in any other position, if desired, and the terms "vertical" and "horizontal," as applied to these parts, are only used to render their relative positions and movements clear.

We are aware that it is old to secure the presser-bar to the bar that carries the points or sinkers. This is shown in United States Patent No. 251,184, December 20, 1881, wherein the presser-bar takes all the movements and vibrations of the sinker-bar; but it is new with us to make the presser-bar independent of the sinker-bar and to give it independent movement. By this means we can move the presser-bar at any desired moment, and we reduce to a minimum the friction on the threads that is caused by the movement of the presser-bar in unison with the sinker-bar. By using our independent presser-bar we are enabled to work the machine faster and to use finer threads than has heretofore been done.

Having now described our invention, what we claim is—

1. The combination of the vertically-movable needle-bar $d'$, having bearded needles, levers $d^2$, carrying said needle-bar and cams D, horizontally-reciprocating independent and separate presser-bar $e'$, rock-shaft e, levers $e^2$, carried by the shaft e and supporting the separate presser-bar $e'$ and cam E, for actuating the levers $e^2$, separate and horizontally-movable sinker-bar $f'$, carrying points $f^\times$ and the comb-like sley i, that is secured to the bar $f'$ below the point $f^\times$, shaft f, levers $f^2$, carrying the separate sinker-bar $f'$ and cams F, and the longitudinally and laterally movable guide-bars $g^3$, with mechanism, substantially as described, for moving said guide-bars, all as specified.

2. The combination of a needle-bar having bearded needles, levers $d^2$ and cams D, for supporting and moving said needle-bar, a separate and independent presser-bar, rock-shaft e, levers $e^2$, carried by the shaft and supporting the independent presser-bar and cams E, for giving independent movement to the presser-bar, and a separate sinker-bar carrying the sinkers, and carrying also the sley separate from the said sinkers, shaft f and levers $f^2$ carrying said sinker-bar and cams F, a shaft carrying the cams and guide-bars, and mechanism, substantially as described, by which an endwise or longitudinally-reciprocating motion and lateral motion is imparted to the guide-bars, substantially as set forth.

3. The combination of the guide-bar rock-shaft g, levers $g'$, having forked arms $g^2$, guide-bar $g^3$, guided by said arms and levers, lever $g^{14}$, having slotted end, elbow-lever $g^{15}$, having slotted upper end, spindle $g^{16}$, slide-piece $g^{17}$, carrying said spindle and guided in the slotted ends of the levers, and cam-shaft C, having cams G G', substantially as set forth.

4. The combination of the levers $g'$, guide-bar arms $g^2$, carried thereby, said arms having slots, screws $g^{21}$ for said slots, and guide-bars $g^3$, guided in the arms $g^2$, and having pins $g^4$, that pass through the levers $g'$ and arms $g^2$, all arranged so that the arms $g^2$ may be turned to tip the guide-bars, substantially as herein shown and described.

In testimony that we claim the foregoing as our invention we have signed our names in presence of two subscribing witnesses.

HENRY BLACKFORD PAYNE.
WILLIAM CAMPION.

Witnesses:
 JAMES R. HANCOCK,
  *Boulevard Works, Nottingham.*
 TOM TERRY,
  *Elm Avenue, Long Eaton, Derbyshire.*